(12) United States Patent
Cole

(10) Patent No.: US 6,865,272 B2
(45) Date of Patent: Mar. 8, 2005

(54) EXECUTING PERMUTATIONS

(75) Inventor: Anthony James Cole, Bristol (GB)

(73) Assignee: STMicroelectronics Limited, Almondsbury Bristol (GB)

(*) Notice: Subject to any disclaimer, the term of this patent is extended or adjusted under 35 U.S.C. 154(b) by 138 days.

(21) Appl. No.: 10/117,934

(22) Filed: Apr. 8, 2002

(65) Prior Publication Data
US 2003/0138098 A1 Jul. 24, 2003

Related U.S. Application Data

(63) Continuation of application No. 09/994,382, filed on Nov. 26, 2001, now abandoned, which is a continuation of application No. 09/893,305, filed on Jun. 27, 2001, now abandoned, which is a continuation of application No. 09/698,486, filed on Oct. 27, 2000, now abandoned, which is a continuation of application No. 09/505,397, filed on Feb. 16, 2000, now abandoned, which is a continuation of application No. 09/362,407, filed on Jul. 28, 1999, now abandoned, which is a continuation of application No. 09/226,981, filed on Jan. 8, 1999, now abandoned.

(30) Foreign Application Priority Data

Jan. 27, 1998 (GB) .............................................. 9801713

(51) Int. Cl.[7] .............................. H04L 9/00; G06F 7/58
(52) U.S. Cl. ......................... 380/28; 380/37; 708/209; 708/250; 712/300
(58) Field of Search ............................ 380/252, 28, 37, 380/265, 268, 29; 712/300; 708/209, 253, 250

(56) References Cited

U.S. PATENT DOCUMENTS 3,383,661 A * 5/1968 Goldstein ................... 708/200
5,168,521 A   12/1992 Delaporte et al.
5,412,728 A    5/1995 Besnard et al.
5,822,619 A * 10/1998 Sidwell ....................... 712/300
5,884,069 A *  3/1999 Sidwell ....................... 712/221
6,145,077 A * 11/2000 Sidwell et al. .............. 712/300

FOREIGN PATENT DOCUMENTS

WO    WO 98 38767    9/1998

OTHER PUBLICATIONS

Standard Search Report dated Oct. 16, 1998, issued by the European Patent Office.

*Multiple Master Keys*, IBM Technical Disclosure Bulletin, vol. 32, No. 8A, Jan. 1, 1990, pp. 239–242.

* cited by examiner

*Primary Examiner*—Gilberto Barron
*Assistant Examiner*—Jung W Kim
(74) *Attorney, Agent, or Firm*—Lisa K. Jorgenson; James H. Morris; Wolf, Greenfield & Sacks, P.C.

(57) ABSTRACT

A method for changing the bit-order of a data value in a data processing system having a register capable of storing data strings which each comprise a plurality of sub-strings that are not individually addressable, the method comprising assigning an output data string by the steps of: loading the data value into a first data string; generating, for each sub-string of the output data string, a corresponding intermediate data string, each sub-string of which corresponds to a selected bit on the first data string and has all its bits equal to the value of the selected bit; and generating the output data string, in each sub-string of which each bit has the same value as the bits in a selected sub-string of the intermediate data string that corresponds to that sub-string of the output data string.

20 Claims, 10 Drawing Sheets

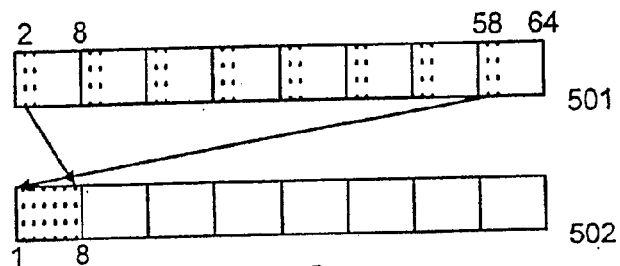
FIG. 1
```
58  50  42  34  26  18  10   2
60  52  44  36  28  20  12   4
62  54  46  38  30  22  14   6
64  56  48  40  32  24  16   8
57  49  41  33  25  17   9   1
59  51  43  35  27  19  11   3
61  53  45  37  29  21  13   5
63  55  47  39  31  23  15   7
```
FIG. 2
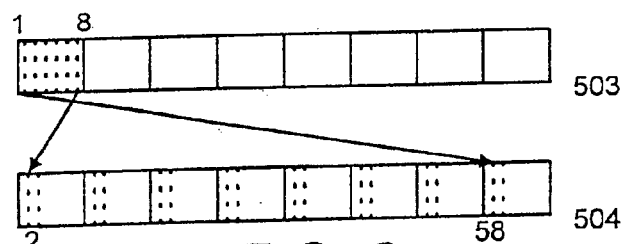
FIG. 3
```
40   8  48  16  56  24  64  32
39   7  47  15  55  23  63  31
38   6  46  14  54  22  62  30
37   5  45  13  53  24  61  29
36   4  44  12  52  20  60  28
35   3  43  11  51  19  59  27
34   2  42  10  50  18  58  26
33   1  41   9  49  17  57  25
```
FIG. 4

PROCESSOR & MEMORY

PACKED UNIT

OBVIOUS PACKED ARITHMETIC

FIG. 7 SYMBOLS

| SYMBOL | OPERATION |
|---|---|
| ▽ | ARITHMETIC LOGIC UNIT. COMBINES THE TWO SOURCE VALUES IN SOME MANNER TO PRODUCE A RESULT. |
| →\|R[3]\|R[2]\|R[1]\|R[0]\|→ (with arrows) | BUFFER. THIS PARTICULAR ONE HAS AN INPUT WHICH IS UNSEPARATED AND FOUR SEPARATED OUTPUTS, EACH TAKING ONE QUARTER OF THE INPUT SIGNALS. IT ALSO HAS AN OUTPUT ENABLE INPUT. |
| (multiplexer symbol) | MULTIPLEXER. THE OUTPUT CONSISTS OF ONE OF THE TWO INPUT SIGNALS. WHEN THE CONTROL SIGNAL IS NOT ASSERTED, THE UNSHADED INPUT SIGNAL IS OUTPUT. WHEN THE CONTROL SIGNAL IS ASSERTED, THE SHADED INPUT SIGNAL IS OUTPUT. |
| (changeover switch symbol) | CHANGEOVER SWITCH. EACH OF THE TWO OUTPUTS CONSISTS OF ONE OF THE INPUT SIGNALS. WHEN THE CONTROL SIGNAL IS NOT ASSERTED, THE UNSHADED INPUT GOES TO THE UNSHADED OUTPUT AND THE SHADED INPUT GOES TO THE SHADED OUTPUT. WHEN THE CONTROL SIGNAL IS ASSERTED, THE OUTPUTS SWAP OVER. |

OBVIOUS PACKED ARITHMETIC WITH UNPACKED OPERAND

BYTE REPLICATE

ZIP AND UNZIP

FLIP

64-BIT ZIPS AND UNZIPS

DOUBLE LENGTH 8-BIT ZIP AND UNZIP

DOUBLE LENGTH 16-BIT AND 32-BIT ZIP AND UNZIP

8-BIT FLIPS

16-BIT AND 32-BIT FLIPS

EXECUTING PERMUTATIONS

BACKGROUND OF THE INVENTION

This invention relates to methods and systems for changing the bit-order of data.

There are numerous circumstances when the bit order of data needs to be changed. Examples are in cryptography and interleaving algorithms (e.g. Reed Solomon).

SUMMARY OF THE INVENTION

One example in cryptography is in encoding or decoding data according to the data encryption standard (DES). Details of the DES algorithm are given in National Institute of Standards and Technology—FIPS PUB 46-1, Data Encryption Standard and in "Privacy and Authentication: An Introduction to Cryptography", Diffie & Hellman, Proceedings of the IEEE, vol. 67, pp. 397–427, 1979. The DES algorithm is a block cipher that operates on 64-bit blocks of plaintext data and uses a 56-bit key. Essentially the same algorithm is used for encryption and decryption. The overall transformations employed in the DES algorithm may be written as $P^{-1}\{F[P(X)]\}$, where X is the plaintext, P is a certain permutation and the function F combines substitutions and transpositions. The permutation P is known as the initial permutation (IP) because it is performed at the outset of encoding a block of data. The inverse permutation $P^{-1}$ is known as the inverse initial permutation (IIP) and is performed at the end of encoding a block of data. FIG. 1 illustrates the IP. A 64-bit input value 501 is re-ordered to form a 64-bit output value 502 in which the 1st bit has the value of the 58th input bit, the 2nd bit has the value of the 50th input bit and so on. The full forward ordering scheme is given in the table in FIG. 2. FIG. 3 illustrates the IIP. A 64-bit input value 503 is re-ordered to form a 64-bit output value 504 in which the 1st bit has the value of the 40th input bit, the 2nd bit has the value of the 8th input bit and so on. The full inverse ordering scheme is given in the table in FIG. 4. (In FIGS. 1 to 4 bit-position 1 is the most significant bit (MSB) and position 64 is the least significant bit (LSB)).

When the DES algorithm is being executed there is a need to perform these permutations as quickly as possible. The permutations are normally performed by the simplest means: a look-up table. Furthermore, the procedure used to implement the look-up table is usually of a loop structure, the branching of which does not make best use of modern processors equipped with predictive capabilities. Similar considerations apply to other applications that require permutations to be performed.

According to the present invention from a first aspect there is provided a method for changing the bit-order of a data value in a data processing system having a register capable of storing data strings which each comprise a plurality of sub-strings that are not individually addressable, the method comprising assigning an output data string by the steps of:

loading the data value into a first data string;

generating, for each sub-string of the output data string, a corresponding intermediate data string, each sub-string of which corresponds to a selected bit in the first data string and has all its bits equal to the value of the selected bit; and generating the output data string, in each sub-string of which each bit has the same value as the bits in a selected sub-string of the intermediate data string that corresponds to that sub-string of the output data string.

Preferably one or more of the intermediate data strings is generated by the steps of: masking, at the first data string, all but the selected bits corresponding to the sub-strings of the intermediate data string; and allocating to all the bits of each sub-string in the intermediate data string the value of the umasked selected bit corresponding to that sub-string of the intermediate data string.

Preferably the step of generating the output data string comprises the step of, for each intermediate data string, generating a corresponding second intermediate data string by masking all but one bit in each sub-string of the respective intermediate data string.

Preferably the step of generating the output data string comprises the step of, for each sub-string of the output data string generating an intermediate sub-string corresponding to the respective second intermediate data string by performing an OR operation on the sub-strings of that second intermediate data string. The OR operation could be performed by any suitable method that has an ORing effect.

Preferably the step of generating the output data string comprises bit shifting at least one intermediate sub-string to a desired position in the output data string.

Preferably for each intermediate data string no more than one of the selected bits is located in any sub-string of the first data string, suitably with each sub-string of the intermediate data string corresponding to a single sub-string in the first data string. Preferably all the selected bits are located at a single selected bit-position in each sub-string of the first data string, suitably with each intermediate data string being associated with a selected bit position in the sub-string of the first data string.

According to the present invention from a second aspect there is provided a data processing system comprising:

processing means;

a register capable of storing data strings which each comprise a plurality of sub-strings that are not individually addressable; and a program memory for storing a set of instructions for the processor to change the bit-order of a data value by assigning an output data string according to the following steps:

a. loading the data value into a first data string;

b. generating, for each sub-string of the output data string, a corresponding intermediate data string, each sub-string of which corresponds to a selected bit in the first data string and has all its bits equal to the value of the selected bit; and c. generating the output data string, in each sub-string of which each bit has the same value as the bits in a selected sub-string of the intermediate data string that corresponds to that sub-string of the output data string.

According to the present invention from a third aspect there is provided a method for changing the bit-order of a data value in a data processing system having a register capable of storing data strings which each comprise a plurality of sub-strings that arc not individually addressable, the method comprising assigning an output data string by the steps of:

loading the data value into a first data string;

generating, for each bit-position in the sub-strings of the output data string, a corresponding intermediate data string associated with a selected sub-string of the input data string, each sub-string of that intermediate data string corresponding to a bit-position in the sub-strings of the first data string and having all its bits equal to the value of the bit at that bit-position in the respective sub-string of the first data string; and generating the output data string, in which each of the bits at each bit-position in the sub-strings of which has the same value as the bits in a selected sub-string of the intermediate data string corresponding to that bit-position.

Preferably each of the intermediate data strings is generated by the step of: expanding the sub-string associated with that intermediate data string so that each of the bits of that sub-string determines the value of all the bits in the corresponding sub-string of the intermediate data string.

Preferably the step of generating the intermediate data strings comprises bit shifting at least one sub-string of the input data string.

Preferably the step of generating the output data string comprises the step of: generating a second intermediate data string corresponding to each intermediate data string by masking all but one bit in each sub-string of the respective intermediate data string.

Preferably the step of generating the output data string comprises the step of performing an OR operation on the second intermediate data strings. The OR operation could be performed by any suitable method that has an ORing effect.

According to the present invention from a fourth aspect there is provided a data processing system comprising:

processing means;

a register capable of storing data strings which each comprise a plurality of sub-strings that are not individually addressable; and a program memory for storing a set of instructions for the processor to change the bit-order of a data value by assigning an output data string according to the following steps:

a. loading the data value into a first data string;

b. generating, for each sub-string of the output data string, a corresponding intermediate data string, each sub-string of which corresponds to a selected bit in the first data string and has all its bits equal to the value of the selected bit; and c. generating the output data string, in which each of the bits at each bit-position in the sub-strings of which has the same value as the bits in a selected sub-string of the intermediate data string that corresponds to that bit-position.

In all the aspects of the invention it is preferred that each bit represents a binary digit. Suitably all the data strings have the same bit-length; preferred lengths are 32, 64 and 128 bits. Suitably all the data strings have the same number of sub-strings; preferred numbers are 4, 8 and 16. Suitably all the sub-strings have the same bit-length; preferred lengths are 4, 8 and 16. Suitably the number of bits in each sub-string equals the number of sub-strings in each data string. One most preferred arrangement is for each data string to have 64 bits and be composed of 8 8-bit sub-strings. The data value may be formed of several smaller data values.

In all the aspects of the invention the order of the steps could be such that only one or some of the intermediate data strings are generated before the output data string is begun to be generated. Preferably the relevant bits derived from an intermediate data string are included in the output data string before the next intermediate data string is generated. Preferably each bit in the first data string has a corresponding bit in the output data-string. A bit's bit-position is suitably determined by its bit-significance (in the range from MSB to LSB) in its sub-string.

In all the aspects of the invention the output data string is preferably generated by setting its bits to be equal to the appropriate bits of the other strings and/or substrings as described above.

The methods and systems may be used for implementing permutations of various sorts. The methods and systems may be used in, for example, encryption, decryption, interleaving or de-interleaving. The data value may represent data to be, for example, compressed, decompressed, interleaved or de-interleaved.

Some or all of the steps and/or instructions are suitably performed by a computer, suitably according to a stored program. The computer may provide specific instructions for performing one or more of the steps. In particular there may be specific instructions for performing masking (for example AND instructions), ORing (for example OR instructions or addacr instructions or other instructions of that type to OR sub-strings together) or expanding bits to occupy a sub-string (for example cmpne instructions or other instructions of that type). The instructions preferably operate on data strings whose sub-strings are not individually accessible. The instructions may be of the packed arithmetic type.

The computer or the data processing system may be part of an encryption, decryption, interleaving, de-interleaving or communication system. Particular examples of the algorithms that may be performed include the DES permutation, the DES inverse permutation, Reed-Solomon interleaving and Reed-Solomon de-interleaving.

BRIEF DESCRIPTION OF THE DRAWINGS

The present invention will now be described by way of example with reference to the accompanying drawings in which:

FIG. 1 illustrates the IP permutation in the DES algorithm;

FIG. 2 shows the IP ordering scheme;

FIG. 3 illustrates the IIP permutation in the DES algorithm;

FIG. 4 shows the lip ordering scheme;

FIG. 7 shows the meaning of symbols used in the figures;

DETAILED DESCRIPTION OF THE PREFERRED EMBODIMENT

A computer suitable for performing the method of the present invention will now be described.

Figure 5:
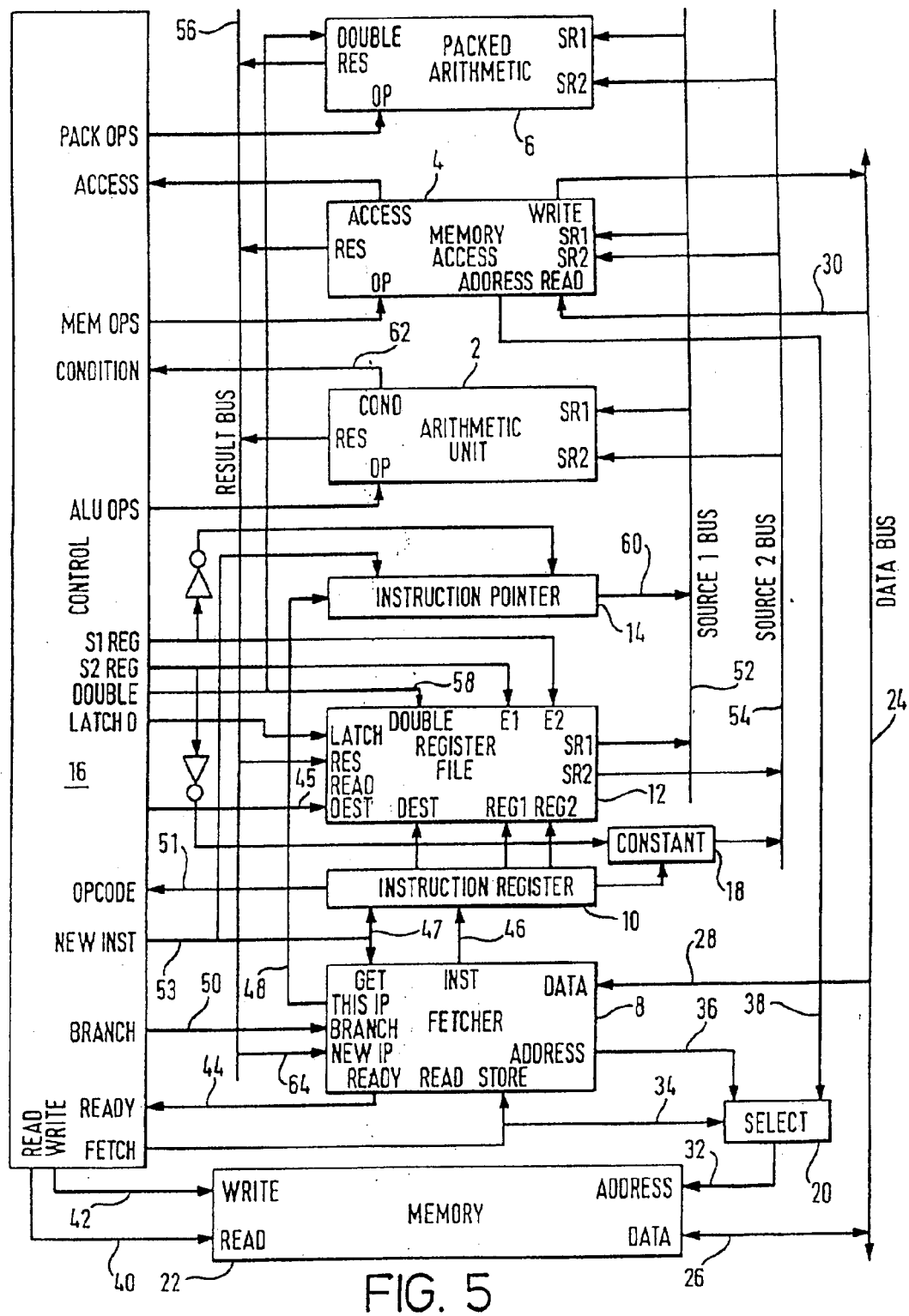
FIG. 5 is a block diagram of a processor and memory of a computer.

FIG. 5 shows a processor in accordance with one embodiment of the present invention. The processor has three execution units including a conventional arithmetic unit 2 and a memory access unit 4. In addition there is a packed arithmetic unit 6. The processor also includes an instruction fetcher 8, an instruction register 10, a register file 12 and an instruction pointer 14 all of which operate under the control of a control unit 16 of the processor. The register file comprises a set of registers each having a predetermined bit capacity and each being addressable with a single address. It is not possible to address individual locations within a register. When a register is accessed, the entire contents of the register are concerned. The processor further includes a constant unit 18 and a select unit 20. The constant unit 18 and select unit 20 are also operated under the control of the control unit 16. The processor operates in conjunction with a memory 22 which holds instructions and data values for effecting operations of the processor. Data values and instructions are supplied to and from the memory 22 via a data bus 24. The data bus 24 supplies data values to and from the memory 22 via a memory data input 26. The data bus 24 also supplies data to the instruction fetcher 8 via a fetcher data input 28 and to the memory access unit 4 via a memory access read input 30. The memory is addressed via the select unit 20 on address input 32. The select unit 20 is controlled via a fetch signal 34 from the control unit 16 to select an address 36 from the fetcher 8 or an address 38 from the memory access unit 4. Read and write control lines 40,42 from the control unit 16 control read and write operations to and from the memory 22. The instruction fetcher 8 fetches instructions from the memory 22 under the control of the control unit 16 as follows. An address 36 from which instructions are to be read is provided to the memory 22 via the select unit 20. These instructions are provided via the data bus 24 to the fetcher data input 28. When the instruction fetcher has fetched its next instruction, or in any event has a next instruction ready, it issues a Ready signal on line 44 to the control unit 16. The instruction which is to be executed is supplied to the instruction register 10 along instruction line Inst 46 and held there during its execution. The instruction pointer 14 holds the address of the instruction being executed supplied to it from the fetcher 8 via instruction pointer line 48. A Get signal 47 responsive to a New Inst signal 53 from the control unit 16 causes the instruction register 10 to store the next instruction on Inst line 46 and causes the fetcher 8 to prepare the next instruction. The New Inst signal 53 also causes the instruction pointer 14 to store the address of the next instruction. A branch line 50 from the control unit 16 allows the instruction fetcher 8 to execute branches.

The instruction register 10 provides Source 1 and Source 2 register addresses to the register file 12 as Reg1 and Reg2. A result register address is provided as Dest. Opcode is provided to the control unit 16 along line 51. In addition, some instructions will provide a constant operand instead of encoding one or both source registers. The constant is provided by the constant unit 18. The instruction's source values are provided on Source 1 and Source 2 buses 52,54 by the appropriate settings of the S1 Reg and S2 Reg signals at inputs E1,E2. The correct execution unit is enabled by providing the appropriate values for Pack Ops, Mem Ops and ALU Ops signals from the control unit 16 in accordance with the Opcode on line 51. The enabled unit will normally provide a result Res on a result bus 56. This is normally stored in the selected result register Dest in the register file 12. There are some exceptions to this.

Some instructions provide a Double length result. These store the first part of the result in the normal way. In a subsequent additional stage, the second part of the result is stored in the next register in the register file 12 by asserting a Double signal 58.

Branches 50 need to read and adjust the instruction pointer 14. These cause the S1 Reg signal not to be asserted, and so the instruction pointer 14 provides the Source 1 value on line 60. The Source 2 value is provided in the normal way (either from a register in the register file 12, or the constant unit 18). The arithmetic unit 2 executes the branch calculations and its result is stored into the fetcher 8 on the New IP input 64, rather than the register file 12, signalled by the Branch line 50 from the control unit 16. This starts the fetcher from a new address.

Conditional branches must execute in two stages depending on the state of condition line 62. The first stage uses the Dest Register as another source, by asserting a Read Dest signal 45. If the condition is satisfied, then the normal branch source operands are read and a branch is executed.

Calls must save a return address. This is done by storing the instruction pointer value in a destination register prior to calculating the branch target.

The computer described herein has several noteworthy general qualities.

Source operands are always the natural word length. There can be one, two or three source operands.

The result is always the natural word length, or twice the natural word length. There is a performance penalty when it is twice the natural word length as it takes an extra stage to store and occupies two, rather than one, registers. For this computer, assume a natural word length of 64 bits. That is, each register in the register file has a predetermined capacity of 64 bits.

The execution units 2,4,6 do not hold any state between instruction execution. Thus subsequent instructions are independent.

Non-Packed Instructions

The arithmetic unit 2 and memory access unit 4, along with the control unit 16 can execute the following instructions of a conventional instruction set. In the following definitions, a register is used to denote the contents of a register as well as a register itself as a storage location, in a manner familiar to a person skilled in the art.

| | |
|---|---|
| mov | Move a constant or a register into a register |
| add | Add two registers together and store the result in a third register (which could be the same as either of the sources) |
| sub | Subtract two registers and store the result in a third register |
| load | Use one register as an address and read from that location in memory, storing the result into another register |
| store | Use one register as an address and store the contents of another register into memory at the location specified by the address |
| cmpe | Compare two registers (or a register and a constant) for equality. If they are equal, store 1 into the destination register otherwise store zero |
| cmpge | Compare two registers (or a register and a constant) for orderability. If the second is not less than the first, store 1 into the destination register other wise store zero |
| jump | Unconditional jump to a new location |
| jumpz | Jump to a new program location, if the contents of a specified register is zero |
| jumpnz | Jump to a new program location, if the contents of a specified register is not zero |
| shr | Perform a bitwise right shift of a register by a constant or another register and store the result in a destination register. The shift is signed because the sign bit is duplicated when shifting |

| | |
|---|---|
| shl | Perform a bitwise left shift of a register by a constant or another register and store the result in a destination register |
| or/xor | Perform a bitwise logical operation (or/xor) on two registers and store result in destination register. |

Packed Unit

Figure 6:
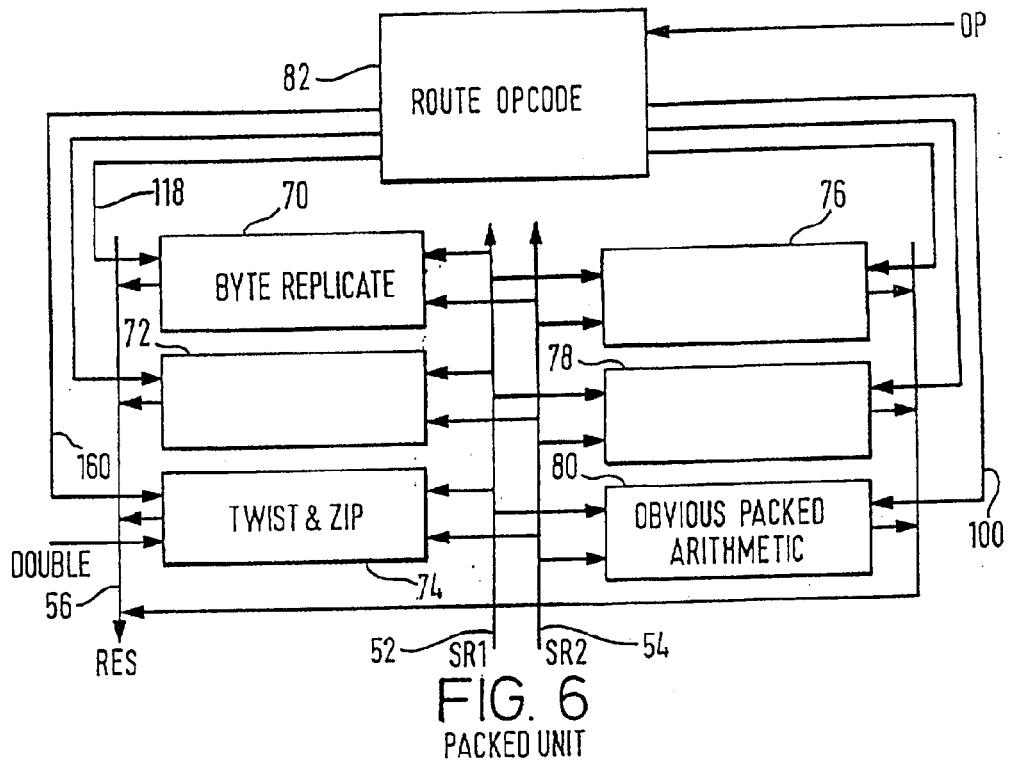
FIG. 6 is a block diagram of a packed arithmetic unit.

FIG. 6 shows in a block diagram the packed arithmetic unit 6. This is shown as a collection of separate units each responsible for some subset of packed arithmetic instructions. Another implementation could combine the functions in different ways. The units include a byte replicate unit 70, a mask unit 72, a twist and zip unit 74, an obvious packed arithmetic unit 80 and other units 76 and 78 which are not described herein. These are all operated responsive to a route opcode unit 82 which selectively controls the arithmetic units 70 to 80. Operands for the arithmetic units 70 to 80 are supplied along the Source 1 and Source 2 buses 52,54. Results from the arithmetic units are supplied to the result bus 56. The op input to the route opcode unit 82 receives the Pack Ops instruction from the control unit 16 (FIG. 1). It will be appreciated that the operands supplied on the Source 1 and Source 2 buses are loaded into respective input buffers of the arithmetic units and the results supplied from one or two output buffers to one or two destination registers in the register file 12.

Obvious Packed Arithmetic

The obvious packed arithmetic unit 80 performs operations taking the two source operands as containing several packed objects each and operating on respective pairs of objects in the two operands to produce a result also containing the same number of packed objects as each source. The operations supported can be addition, subtraction, comparison, multiplication, left shift, right shift etc. As explained above, by addressing a register using a single address an operand will be accessed. The operand comprises a plurality of objects which cannot be individually addressed.

FIG. 7 shows the symbols used in the diagrams illustrating the arithmetic units of the packed arithmetic unit 6.

Figure 8:
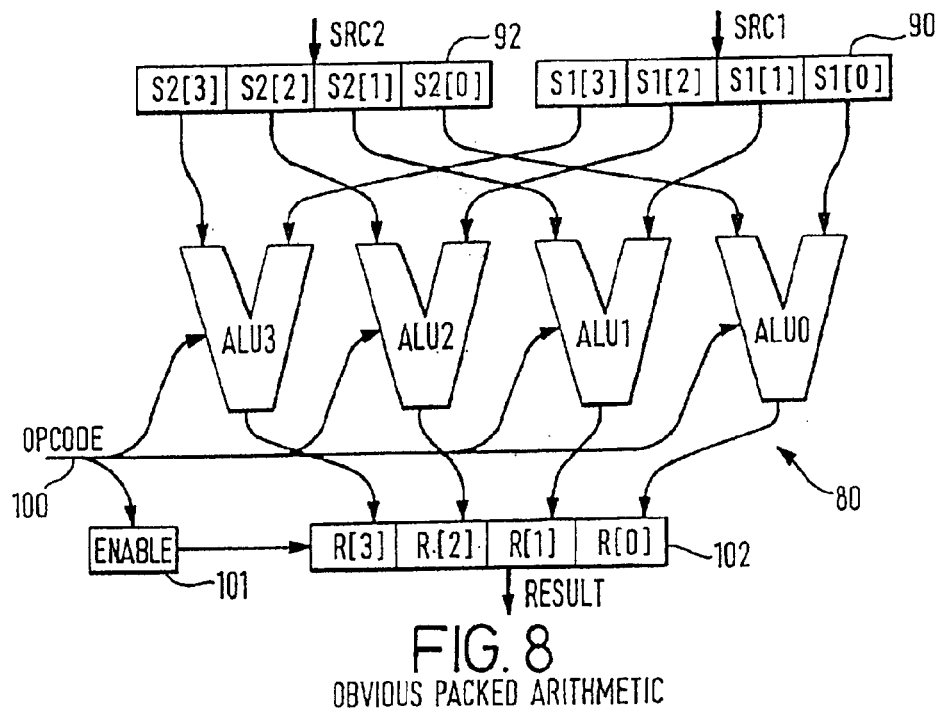
FIG. 8 is a block diagram of an obvious packed arithmetic unit operating on two packed source operands.

FIG. 8 shows an obvious packed arithmetic unit which can perform addition, subtraction, comparison and multiplication of packed 16 bit numbers. As, in this case, the source and result bus widths are 64 bit, there are four packed objects, each 16 bits long, on each bus.

The obvious packed arithmetic unit 80 comprises four arithmetic logical units ALU0–ALU3, each of which are controlled by opcode on line 100 which is derived form the route opcode unit 82 in FIG. 3. The 64 bit word supplied from source register 1 SRC1 contains four packed objects S1[0]–S1[3]. The 64 bit word supplied from source register 2 SRC2 contains four packed objects S2[0]–S2[3]. These are stored in first and second input buffers 90,92. The first arithmetic logic unit ALU0 operates on the first packed object in each operand, S1[0] and S2[0] to generate a result R[0]. The second to fourth arithmetic logic units ALU1–ALU3 similarly take the second to fourth pairs of objects and provide respective results R[1] to R[3]. These are stored in a result buffer 102. The result word thus contains four packed objects. An enable unit 101 determines if any of the unit should be active and controls whether the output buffer asserts its output.

The instructions are named as follows:

| | |
|---|---|
| add2p | Add each respective S1[i] to S2[i] as 2's complement numbers producing R[i]. Overflow is ignored. |
| addacr2p | Or each respective S1[i] with S2[i] as 2's complement numbers producing R[i]. |
| sub2p | Subtract each respective S2[i] from S1[i] as 2's complement numbers producing R[i]. Overflow is ignored. |
| cmpe2p | Compare each respective S1[i] with S2[i]. If they are equal, set R[i] to all ones; if they are different, set R[i] to zero. |
| cmpge2ps | Compare each respective S1[i] with S2[i] as signed 2's complement numbers. If S1[i] is greater than or equal to S2[i] set R[i] to all ones; if S1[i] is less than S2[i] set R[i] to zero. |
| cmpne2p | Compare each respective S1[i] with S2[i]. If they are different, set R[i] to all ones; if they are equal, set R[i] to zero. |
| mul2ps | Multiply each respective S1[i] by S2[i] as signed 2's complement numbers setting R[i] to the least significant 16 bits of the full (32 bit) product. |

Figure 9:
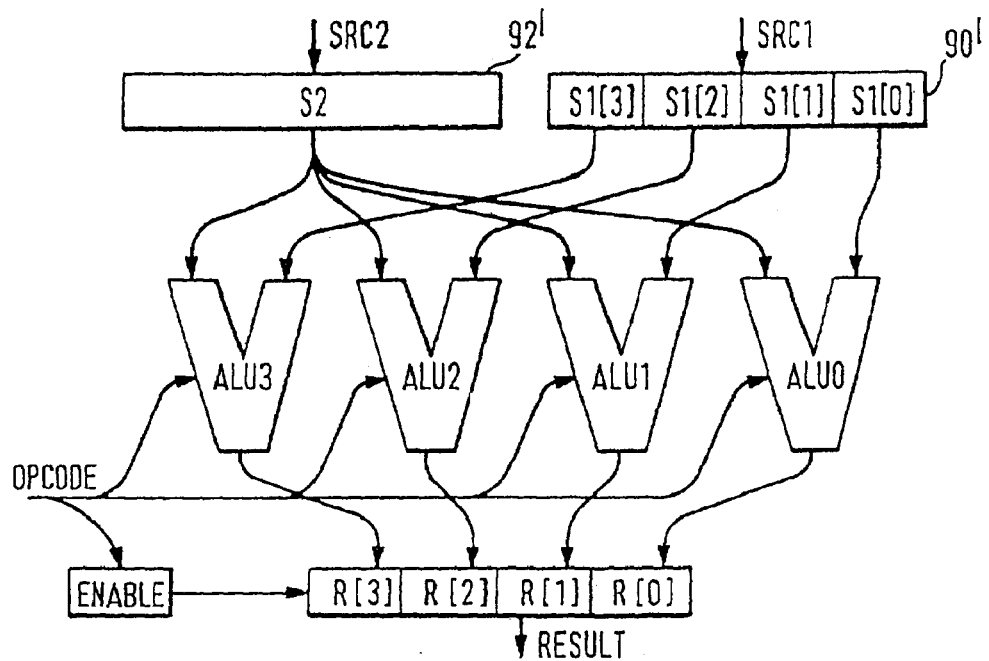
FIG. 9 is a block diagram of an obvious packed arithmetic unit which operates on a packed source operand and an unpacked source operand.

Some obvious packed arithmetic instructions naturally take one packed source operand and one unpacked source operand. FIG. 9 shows such a unit.

The contents of the packed arithmetic unit of FIG. 5 are substantially the same as that of FIG. 4. The only difference is that the input buffer 92' for the second source operand receives the source operand in unpacked form. The input buffer 92' receives the first source operand in packed form as before. One example of instructions using an unpacked source operand and a packed source operand are shift instructions, where the amount to shift by is not packed, so that the same shift can be applied to all the packed objects. Whilst it is not necessary for the shift amount to be unpacked, this is more useful.

| | |
|---|---|
| shl2p | Shift each respective S1[i] left by S2 (which is not packed), setting R[i] to the result. |
| shr2ps | Shift each respective S1[i] right by S2 (which is not packed, setting R[i] to the result. The shift is signed, because the sign bit is duplicated when shifting. |

It is assumed that the same set of operations are provided for packed 8 bit and packed 32 bit objects. The instructions have similar names, but replacing the "2" with a "1" or a "4" respectively.

Byte Replicate

Figure 10:
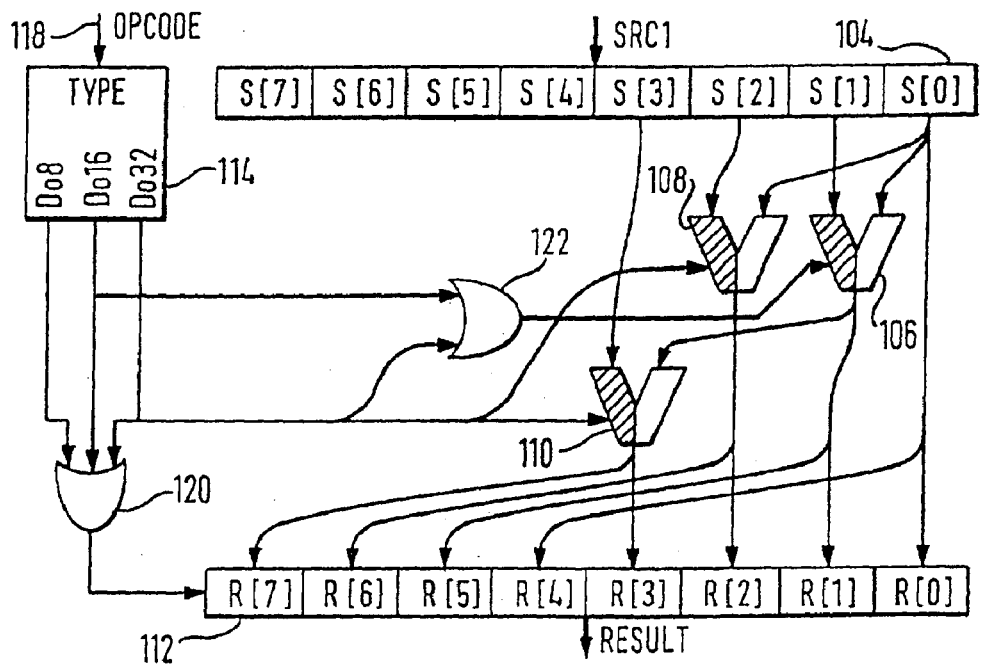
FIG. 10 shows a byte replicate unit.

FIG. 10 shows the byte replicate unit 70. The byte replicate unit comprises an input buffer 104 which receives a single operand which in FIG. 10 is illustrated as a 64 bit word comprising eight packed 8 bit objects S[0] to S[7]. A first multiplexer 106 receives as inputs the first object S[0] and the second object S[1]. A second multiplexer 108 receives as inputs the first object S[0] and the third object S[2]. A third multiplexer 110 receives as inputs the output of the first multiplexer 108 and the fourth object S[3]. The byte replicate unit also comprises an output buffer 112. The output buffer holds a 64 bit word packed as eight 8 bit objects R[0] and R[7]. The first and fifth 8 bit locations of the output buffer 112 are connected directly to the first 8 bits of the input buffer 104. The second and sixth 8 bit locations of the output buffer 112 are connected to receive the output of the first multiplexer 106. The third and seventh 8 bit locations of the output buffer 112 are connected to receive the output of the second multiplexer 108. The fourth and eighth 8 bit locations of the output buffer 112 are connected to receive the output of the third multiplexer 110. The 8 bit result objects in the output buffer are referred to as R[0] to R[7]. A type unit 114 receives opcode on line 118 derived from the route opcode unit 82 in FIG. 7. The type unit selects the size of the object to be replicated and provides one of three output signals D08,D016,D032. These output signals are supplied to an OR gate 120. The output of the OR gate enables the output buffer 112. The D016 and D032 signals are input to a second OR gate 122 the output of which controls the first multiplexer 106. The D032 signal itself controls the second and third multiplexers 108,110. The byte replicate unit thus takes the least significant object (8, 16 or 32 bits) of the source operand and replicates it 8, 4 or 2 times, to produce the packed 64 bit result held in output buffer 112. The operation is broken down into 8 bit pieces, each of S[i] and R[i] are 8 bits. Some logic is shared for the different replications. The type unit 114 determines whether to replicate 16 bit or 32 bit sequences. If neither signal D016 or D032 is asserted, 8 bit sequences will be replicated.

The three instructions supported by the byte replicate unite are:

| | |
|---|---|
| rep1p | Replicate S[0] into each of R[0] to R[7]. |
| rep2p | Replicate S[0] and S[1] into R[2i] and R[2i+1] for I from 0 to 3, thus replicating 16 bits. |
| rep4p | Replicate S[0] to S[3] into R[4i] to R[4i+3] for i from 0 to 1, thus replicating 32 bits. |

Twist and Zip

There are three kinds of restructuring operations executed by the twist and zip unit 74. These are:

| | |
|---|---|
| Shuffle (zip) | This takes a source string consisting of pairs of object strings and interleaves the objects from the object string pairs to produce a single resultant string of the same length as the source string. This is a perfect shuffle. |
| Sort (unzip) | This takes a source string containing object pairs and de-interleaves the pairs to produce a result string consisting of the concatenation of the de-interleaved pairs. This is a perfect sort. |
| Transpose (flip) | This takes a source string containing object quadruples and produces a result string by exchanging appropriate source objects to affect a set of matrix transposes. |

Any one of these operations can alternatively be constructed from suitable combinations of the other two operations.

For all these transformations the source string consists of a number of vectors, each containing the same number of equally sized objects. To name these transformations requires three numbers.

| | |
|---|---|
| number of vectors | This specifies the number of vectors in the source and result strings. |
| size of vector | This specifies the number of objects in each vector. |
| size of object | This specifies the number of bits in each object. |

The instruction names consist of a transform type (zip, unzip, flip), followed by the number of vectors suffixed by an "n", The size of each vector suffixed by a "v" and the object size expressed as a number of 8 bit bytes suffixed by a "p". Thus, in the instruction zip4n2v1p, zip denotes the instruction type, and the 4n2v1p specifies the operand format. In this case a zip operation is to be executed on 4 vectors each of two one byte objects. To do this particular operation, as each zip requires two vectors, two separate zips are done.

Figure 11:
FIG. 11 shows zip and unzip restructuring operations.

When the source and result strings are 64 or 128 bits in total there are 9 unique zip and unzip transforms which are shown in FIG. 11.

This set of zips and unzips is complete for the 64 and 128 bit strings supported by this implementation. Zips and unzips of longer strings can be performed by sequences of these instructions, in conjunction with conventional move instructions.

Figure 12:
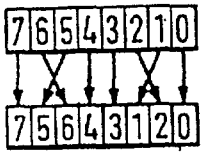
FIG. 12 shows flip restructuring operations.

The flips appropriate to 64 and 128 bit strings are shown in FIG. 12. Some of these are the same as some of the zip and unzips in FIG. 11.

As with the zips and unzips, this set of flips is complete for 64 and 128 bit strings. Flips of longer strings can be performed by sequences of flips and conventional move instructions.

Figure 13:
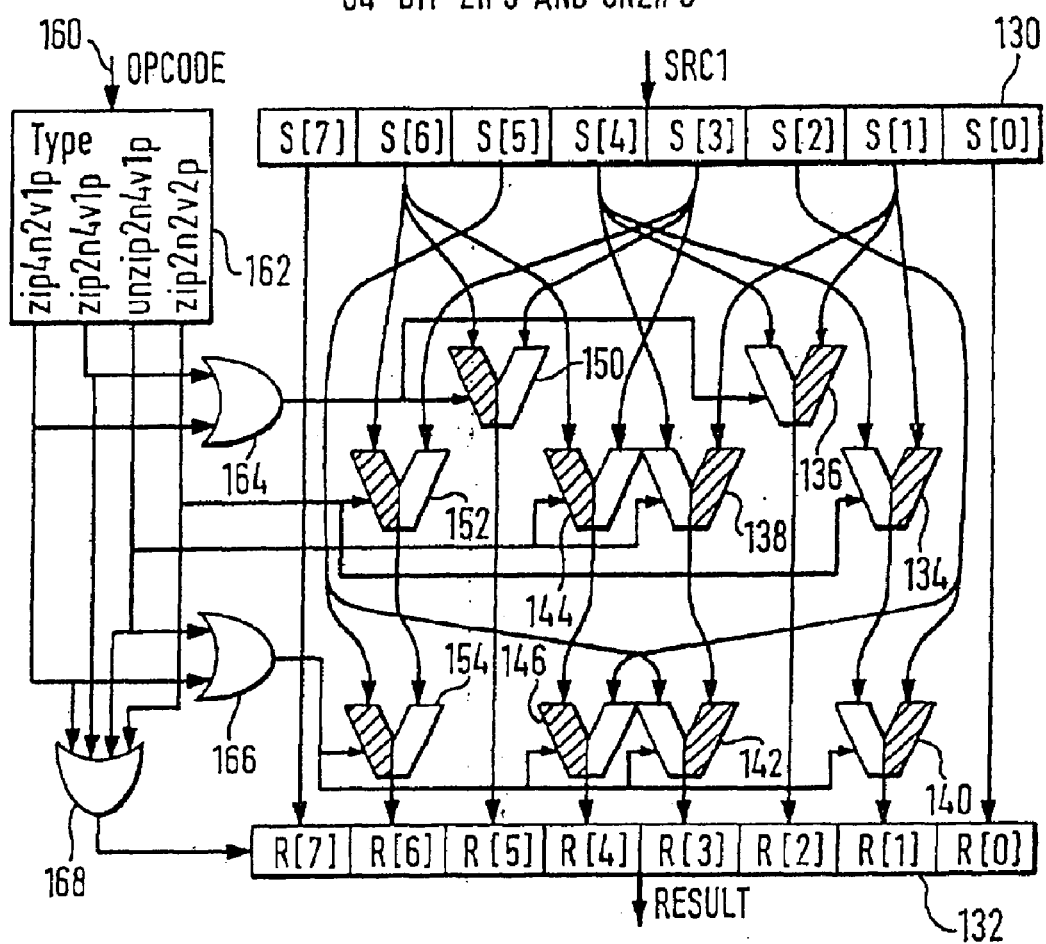
FIG. 13 shows part of the twist and zip unit for performing 64 bit zips and unzips.

FIG. 13 shows the part of the twist and zip unit 74 which deals with 64 bit zips and unzips. The zip and unzip part of the twist and zip unit shown in FIG. 13 comprises an input buffer 130 containing eight packed 8 bit source objects S[0] to S[7]. A result buffer 132 is provided to hold eight packed 8 bit result objects R[0] to R[7]. The result R[0] is connected directly to the first source object S[0]. The second source object S[1] is supplied as one input to a first multiplexer 134, a second multiplexer 136, and a third multiplexer 138. The first, second an third multiplexers 134,136,138 receive as their second input the fifth source object S[4]. A fourth multiplexer 140 receives as one input the third source object S[2] and as its other input the output of the first multiplexer 134. The output of the fourth multiplexer provides the second result object R[1]. The output of the second multiplexer 136 provides the third result object R[2]. A fifth multiplexer 142 receives as inputs the output of the third multiplexer 138 and the sixth source object S[5]. The output of the fifth multiplexer 142 supplies the fourth result object R[3]. A sixth multiplexer 144 receives as one input the fourth source object S[3] and as the other input the seventh source object S[6]. The output of the sixth multiplexer is supplies as one input to a seventh multiplexer 146, the other input of which is the third source object S[2]. The output of the seventh multiplexer 146 supplies the fourth result object R[4]. An eighth multiplexer 150 receives as one input the fourth source object S[6] and supplies as its output the sixth result object R[5]. A ninth multiplexer 153 receives as one input the fourth source object S[3] and as another input the seventh source object S[6]. The output of the ninth multiplexer 152 is supplied to a tenth multiplexer 154 which receives as a second input the sixth source object S[5]/. The output of the tenth multiplexer 154 provides the seventh result object R[6]. The eighth source object S[7] is connected directly to provide the eighth result object R7. A type unit 162 receives opcode on line 160 derived from the route opcode unit 82 in FIG. 2. The type unit 162 defines the instruction to be executed by the zip and unzip part of the twist and zip unit 74. For this purpose it supplies one of four output signals zip2n2v2p, unzip2n4v1p, zip2n4v1p and zip4n2v1p. The zip2n4v1p and zip4n2v1p outputs are supplied to a first OR gate 164 the output of which controls the eighth multiplexer 150. The output signal zip4n2v1p is also supplied to a second OR gate 166 which receives the output unzip2n4v1p. The output of the second OR gate controls the fourth, fifth, seventh and tenth multiplexers. The signal unzip2n4v1p controls the third and sixth multiplexers. The output zip2n2v2p controls the first and ninth multiplexers. All four outputs of the type unit 162 are supplied to a third OR gate 168 which determines whether or not the output buffer 132 is enabled. Some of the logic paths are shared in FIG. 9, this requiring only ten 8 bit multiplexers. The source and result are shown as packed 8 bit objects. However, one of the instructions this implements is defined in terms of packed 16 bit objects and this is achieved by taking pairs of source and result 8 bit objects.

The 64 bit zips and unzips are:

| | |
|---|---|
| zip4n2v1p | Zips (interleaves) vectors of two 8 bit objects. This is the same as unzipping (de-interleaving) the same vectors. |
| zip2n4v1p | Zips (interleaves) vectors of four 8 bit objects. |
| unzip2n4v1p | Unzips (de-interleaves) vectors of four 8 bit objects. |
| zip2n2v2p | Zips (interleaves) vectors of two 16 bit objects. This is the same as unzipping (de-interleaving) the same objects. |

Figure 14:
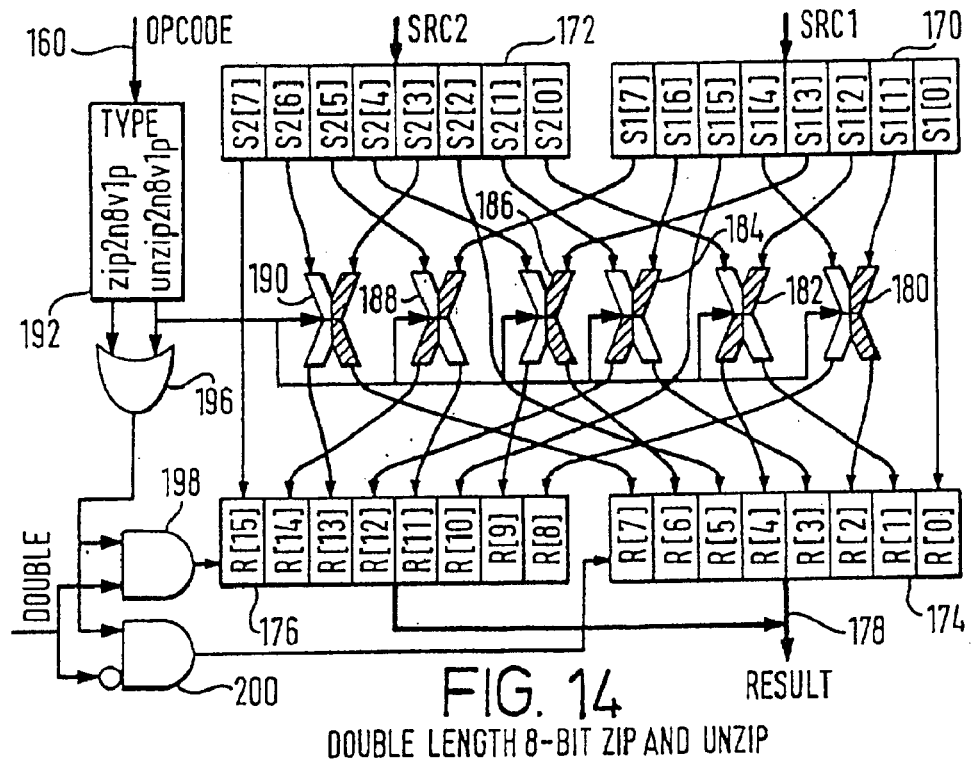
FIG. 14 shows part of the twist and zip unit for performing double length 8 bit zips and unzips.

FIG. 14 shows the part of the twist and zip unit which performs the double length 8 bit zip and unzip instructions. This part of the twist and zip unit comprises first and second input buffers 170,172 each of which hold a 64 bit word. The 64 bit words held in the input buffer 170,172 can be viewed as a continuous data string which has sixteen objects labelled from S1[0] to S2[7]. There are first and second output buffers 174,176 which each hold a 64 bit word. The result is output on line 178. There are six changeover switches 180 to 190 each of which have two inputs and two outputs. The inputs of the changeover switches 180 to 190 are connected to locations in the first and second input buffers 170,172 as illustrated in FIG. 14. The outputs of the changeover switches 118 to 190 are connected to locations in the first and second output buffers 174,176 as illustrated in FIG. 14. The connections are such that either the zip2n8v1p operation or the unzip2n8v1p operation as illustrated in FIG. 11 can be implemented. It can be seen from FIG. 14 that the first location in the first input buffer S1[0] and the last location in the second input buffer S2[7] are connected respectively to the first location R1[0] in the output buffer and the last location R2[7] in the second output buffer. In this way, the locations in the data string of the first and last objects remains unchanged after restructuring of the data string according to the zip and unzip instruction. A type unit 192 receives opcode on line 160 derived from the route opcode unit 82 to FIG. 7. The type unit 192 outputs one of two signals dependent on whether the restructuring instruction is a zip or unzip instruction, zip2n8v1p or unzip2n8v1p. These output signals are supplied to an OR gate 196. The unzip2n8v1p signal controls the changeover switches 180 to 190. The output of the OR gate 196 is supplied to two AND gates 198,200. The AND gate 198 also receives the Double signal 58. The AND gate 200 receives the Double signal 58, inverted. The AND gate 200 controls the first output buffer 174 and the AND gate 198 controls the second output buffer 176. The two output buffers are controlled by the Double signal which causes the first output buffer 174 to supply its contents along line 178 to a first destination register and then changes state so that the second output buffer 176 supplies its contents along line 178 to a subsequent register in the register file 12.

The two instructions processed are:

| | |
|---|---|
| zip2n8v1p | Zip (interleave) vectors of eight 8 bit objects. |
| unzip2n8v1p | Unzip (de-interleave) vectors of eight 8 bit objects. |

Figure 15:
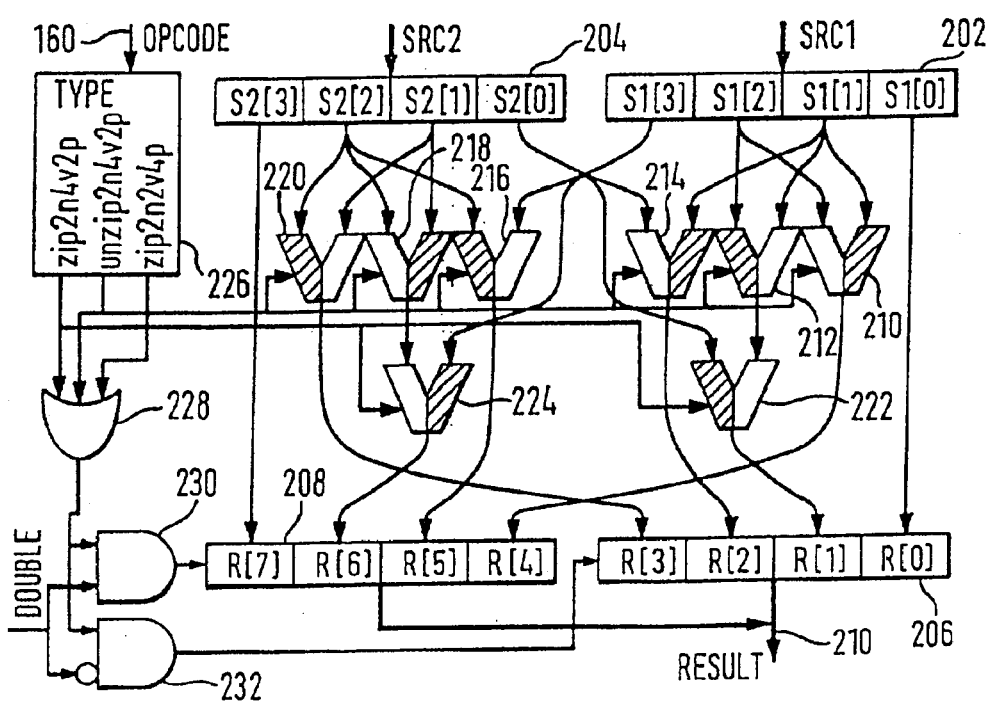
FIG. 15 shows part of the twist and zip unit for performing double length 16 bit and 32 bit zips and unzips.

FIG. 15 shows the part of the twist and zip unit which performs the double length 16 bit and 32 bit zip and unzip instructions. This part has first and second input buffers 202,204 each of which holds a 64 bit word defining four 16 bit objects in packed form. Two objects can be dealt with together by use of the 32 bit zip instruction. First and second output buffers 206 and 208 each hold a 64 bit word defining four packed 16 bit objects R[0] to R[3], R[4] to R[7]. The result is supplied on line 210. The Double signal 58 controls the sequence in which the output buffers assert there its output. As with the other parts of the twist and zip unit, locations in the first input buffer for the first object are corrected directly to the first object location in the first output buffer likewise, the last source object location in the second input buffer 204 is connected directly to the last result objection location R[7] in the second output buffer 208.

A first multiplexer 212 receives as one input the source object S1[1] and as a second input the source object S1[2]. A second multiplexer 212 receives as one input the second source object S1[1] and as a second input the third source object S1[2]. A third multiplexer 214 receives as one input the second source object S1[1] and as a second input the first source object S2[0] of the second input buffer. A fourth multiplexer 216 receives as one input the source object S1[3] and as a second input the source object S2[2]. A fifth multiplexer 218 receives as one input the source object S2[1] and as a second input the source object S2[2]. A sixth multiplexer 220 receives as one input the source object S2[1] and as a second input the source object S2[2]. The output of the first multiplexer 210 supplies the first result object R[4] of the second output buffer 208. The output of the second multiplexer 212 is supplied to a seventh multiplexer 222 which receives as its second input the source object S2[0]. The output of the second multiplexer 222 supplies the second result object R[1] in the first output buffer 206. The output of the third multiplexer 214 supplies the third result object R[2] in the first output buffer 206. The output of the fourth multiplexer 216 supplies the second result object R[5] in the second output buffer 208. The output of the fifth multiplexer 218 is supplied as one input to an eighth multiplexer 224 which receives as its second input the source object S1[3]. The output of the eighth multiplexer 224 supplies the third result object R[6] in the second output buffer 208. The output of the sixth multiplexer 220 supplies the fourth result object R[3] in the first output buffer 206. A type unit 226 receives opcode on line 160 from the route opcode unit 82 of FIG. 3. The type unit generates three output signals depending on the type of restructuring operation to be carried out by this part of the twist and zip unit. These signals are zip2n4v2p, unzip2m4v2p and zip2n2v4p. These signals are supplied to an OR gate 228 the output of which is supplied to two AND gates 230 and 232. The AND gate 230 also receives the Double signal. The AND gate 232 receives an inverted version of the Double signal. The outputs of the AND gates 230,232 control activation of the output buffers 206,208.

The zip2n4v2p signal controls the third and seventh multiplexers 214,222. The unzip2n4v2p signal controls the first, second, fourth and fifth multiplexers.

The three instructions processed by this part of the twist and zip unit are:

| | |
|---|---|
| zip2n4v2p | Zip (interleave) vectors of four 16 bit objects. |
| unzip2n4v2p | Unzip (de-interleave) vectors of four 16 bit objects. |
| zip2n2v4p | (interleave) vectors of two 32 bit objects. This is the same as unzipping (de-interleaving) the same vectors. |

Figure 16:
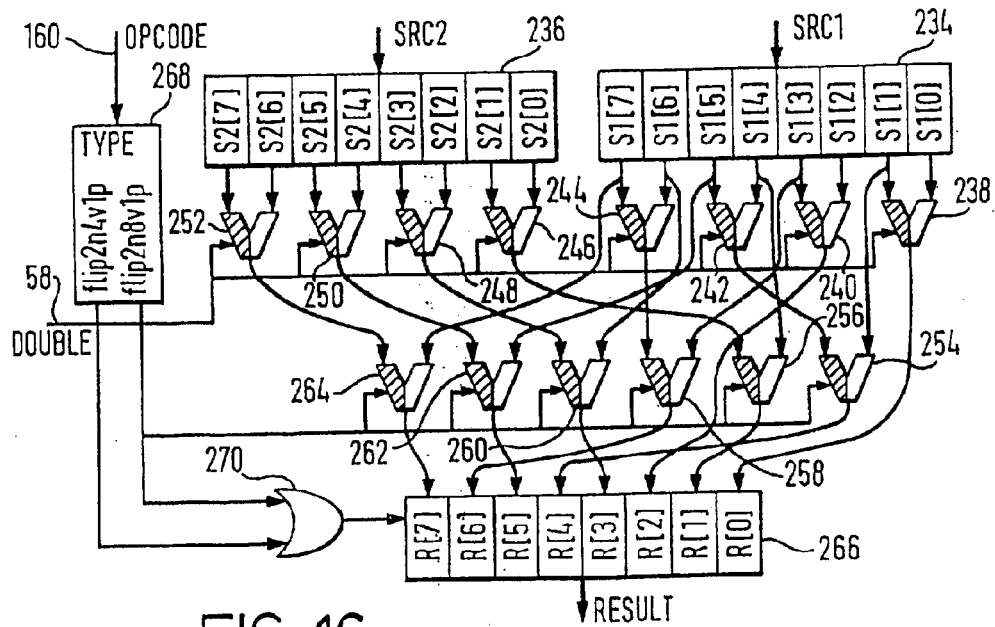
FIG. 16 shows part of the twist and zip unit for performing 8 bit flips.

FIG. 16 shows the part of the twist and zip unit which can perform the 8 bit flips. This does both the single length and double length operations. In FIG. 12 there are two input buffers 234,236 each containing a 64 bit word packed as 8 bit objects. Adjacent pairs of objects in the first and second input buffers 234,236 are supplies to respective multiplexers 238–252. A second set of multiplexers 254–264 is arranged as follows. The first multiplexer 254 of the second set receives as one input the second source object in the first output buffer 234 and as a second input the output of the third multiplexer 242 of the first set. The second multiplexer 256 of the second set receives a one input the fifth source object of the first output buffer 234 and as a second input the output of the fifth multiplexer 246 of the first set. The third multiplexer 258 of the second set receives as one input the fourth source object of the first output buffer 234 and as a second input the output of the fourth multiplexer 244 of the first set. The fourth multiplexer 260 of the second set receives as one input the seventh source object of the first output buffer 234 and as a second input the output of the sixth multiplexer of the first set. The fifth multiplexer 262 of the first set receives as one input the sixth source object of the first output buffer and as a second input the output of the seventh multiplexer 250 of the first set. The sixth multiplexer 264 of the second set receives as one input the eighth source object of the first output buffer 234 and as a second input the output of the eighth multiplexer 252 of the first set. The 8 bit flip part of the twist and zip unit also includes an output buffer 266 for accommodating a 64 bit word as 8 bit packed objects. The first result object is supplied as the output of the first multiplexer 238 of the first set. The second source object is supplied as the output of the second multiplexer 256 of the second set. The third object of the result is supplies as the output of the second multiplexer 240 of the first set. The fourth object of the result is supplies as the output of the fourth multiplexer 260 of the second set. The fifth object of the result is supplied as the output of the first multiplexer 254 of the first set. The sixth object of the result is supplied as the output of the fifth multiplexer 262 of the second set. The seventh object of the result is supplied as the output of the third multiplexer 258 of the second set. The eighth object of the result is supplies as the output of the sixth multiplexer of the second set 164. A type unit 268 receives opcode on line 160 and produces two signals depending on the type of restructuring operation to be carried out. These signals are flip2n4v1p and flip2n8v1p. These signals are supplied to an OR gate 270 and the output of which controls the output buffer 266. The Double signal 58 controls the multiplexers 238 to 252 of the first set. The Double signal will only be active for the upper part of the double length instructions. The multiplexers in the second set 254 to 264 are controlled by the flip2n8v1p signal.

In FIG. 16, only a single 64 bit output buffer is illustrated. When the flip2n4v1p instruction is being executed, the buffer corresponds to the single output buffer shown in FIG. 13. When the 2n8v1p flip instruction is being executed, the output buffer first holds and supplies the RESULT LOW part of the result and then when the Double signal 58 is asserted, holds and supplies the RESULT HIGH part of the result.

The two instructions processed by the unit are:

| flip2n4v1p | Flip vectors of four 8 bit objects. |
| flip2n8v1p | Flip vectors of eight 8 bit objects. |

Figure 17:
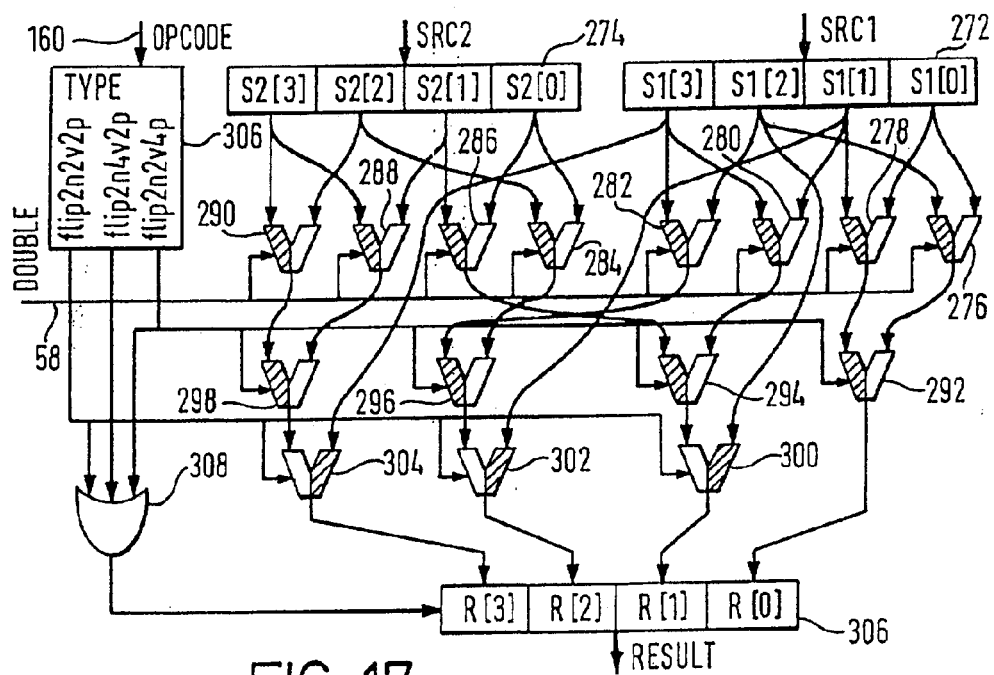
FIG. 17 shows part of the twist and zip unit for performing 16 bit and 32 bit flips.

FIG. 17 shows the part of the twist and zip unit which performs the 16 bit and 32 bit flips. As with the 8 bit flip unit, it performs both single and double length flips. The 32 bit objects are dealt with as pairs of 16 bit objects.

The three instructions processed by the unit are:

| flip2n2v2p | Flip vectors of two 16 bit objects. |
| flip2n4v2p | Flip vectors of four 16 bit objects. |
| flip2n2v4p | Flip vectors of two 32 bit objects. |

Two of these three flips are the same as two of the zips. Therefore, if both sets of instructions are present, only one set of hardware needs implementing.

This part of the twist and zip unit comprises first and second input buffers 272,274 each of which accommodates a 64 bit word packed as four 16 bit objects S1[0] to S1[3] in the first input buffer and S2[0] to S2[3] in the second input buffer 274. A first set of multiplexers 276 to 290 receive inputs from the first and second input buffers 272,274 as follows. The first multiplexer 276 of the first set receives as one input the first source object S1[0] and as a second input the third source object S1[2]. The second multiplexer 278 of the first set receives as one input the first source object S1[0] and as a second input the second source object S1[1]. The third multiplexer 280 of the first set receives as one input the second source object S1[1] and as a second input the fourth source object S1[3]. The fourth multiplexer of the first set 282 receives as one input the third source object S1[2] and as a second input the fourth source object S1[3]. The fourth multiplexer 284 of the first set receives as one input the first source object S2[0] of the second buffer 274 and as a second input the third source object S2[2]. The sixth multiplexer 286 of the first set receives as one input the first source object S2[0] of the second buffer 274 and as a second input the second source object S2[1]. The seventh multiplexer 288 receives as one input the second source object S2[1] and as a second input the fourth source object S2[3]. The eighth multiplexer 290 receives as one input the third source object S2[2] of the second input buffer 274 and as a second input the fourth source object S2[3]. A second set of multiplexers 292 to 298 receive inputs as follows. The first multiplexer 292 of the second set receives as inputs the outputs of the first and second multiplexers 276,278 of the first set. The second multiplexer 294 of the second set receives as inputs the outputs from the third and sixth multiplexers 280,286 of the first set. The third multiplexer 296 of the second set receives as inputs the output of the fifth multiplexer 284 of the first set and the fourth multiplexer 282 of the first set. The fourth multiplexer of the third set receives as inputs the outputs of the seventh and eighth multiplexers 288,290 of the first set. A third set of multiplexers 30–304 receive inputs as follows. The first multiplexer 300 of the third set receives as inputs the third source object S1[2] of the first input buffer 272 and the output of the second multiplexer 294 of the third set. The second multiplexer 302 of the third set receives as inputs the second source object S1[1] of the first input buffer 272 and the output of the third multiplexer 296 of the second set. The third multiplexer 304 of the third set receives as inputs the fourth object S1[3] of the first input buffer 272 and the output of the fourth multiplexer 298 of the second set.

This part of the twist and zip unit also contains an output buffer 306 capable of accommodating a 64 bit word packed as four 16 bit objects. The first result object R[0] is derived from the first multiplexer 292 of the second set. The second to fourth result objects R[1] to R[3] are derived form the outputs of the multiplexers of the third set 300–304.

A type unit 306 receives opcode on line 160 from the route opcode unit 82 in FIG. 7. The type unit generates three signals depending on the type of restructuring instruction to be executed by this part of the unit. The signals are flip2n2v2p, flip2n4v2p and flip2n2v4p. These signals are supplied to an OR gate 308 the output of which controls the output buffer 306. The Double signal 58 controls the multiplexers of the first set 276 to 290. The flip2n2v4p signal controls the multiplexers of the second set. The flip2n2v2p signal controls the multiplexers of the third set.

When this part of the unit is used to execute the flip2n2v2p unit, the output buffer is the single output buffer shown in FIG. 11 for that instruction. When this part of the unit is used to execute the flip2n4v2p or flip2n2v4p instructions, the output buffer behaves as described above with reference to FIG. 12.

Mask

The mask unit 72 executes a mask instruction. This takes an object string and produces a resultant object string by expanding each bit of the least significant object in the input object string to produce a single resultant object in the resultant object string at the same position in the resultant object string as the bit being expanded has in the least significant object of the input object string. Thus, all the bits in the Nth most significant object of the resultant object string have the same value as the Nth most significant bit in the least significant object of the input object string. This operation is illustrated below for the case of an object string of 64 bits containing 8 objects each of 8 bits. The object string is shown in binary with the least significant bits and bytes on the right:

| | |
|---|---|
| input object string: | 10010110 00011011 10100010 11111010 |
| | 00001001 01001110 01100110 10100011 |
| output object string: | 11111111 00000000 11111111 00000000 |
| | 00000000 00000000 11111111 11111111 |

The mask unit 72, uses a series of AND gates to deal with mask operations. Each bit of a first input register is masked in a corresponding AND gate with a corresponding bit of a second input register to produce the corresponding bit of the output word.

The bit-reordering method of the invention will now be described, taking as an example an implementation for performing the DES IP and IIP.

The following C code implements the IP. In this example the input and output words are (as is conventional for DES) each 64-bit words of 8 8-bit bytes. The implementation is for the computer described above using packed arithmetic on 64-bit registers each of 8 8-bit objects.

```
1   /*  Generate output byte 7 from bits 58, 50, 42, 34, 26, 18, 10
        and 2 of */
2   /*  the input data block. */
3   /*  Mask off all but the bits required for the output byte */
4       data = input & 0x4040404040404040LL;
5   /*      Expand each bit to fill its byte position */
6       data = cmpne1p (data,0);
7   /*      Keep one bit per byte in its required position */
8       data &= 0x8040201008040201LL;
9   /*      OR the bytes together to generate the output byte */
10      output = addacr1p (data);
11  /*      Shift output byte 7 to the correct position */
12      output <<=56;
13
14  /*  Generate output byte 6 from bits 39, 7, 47, 15, 55, 23, 63
        and 31 */
15      data = input & 0x1010101010101010LL;
16      data = cmpne1p (data,0);
17      data &= 0x8040201008040201LL;
18      data = addacr1p (data);
19      data <<= 48;
20      output |= data;
21
22  /*  ETC. */
23
24  /*  Generate output byte 0 from bits 63, 55, 47, 39, 31, 23, 15
        and 7 */
25      data = input & 0x0202020202020202LL;
26      data = cmpne1p (data,0);
27      data &= 0x8040201008040201LL;
28      data = addacr1p (data);
29      output |= data;
```

This code will now be described in more detail.

The symbols "/*" and "*/" enclose comments.

At line 4 the input word ("input") is masked with the hexadecimal (indicated by "0x") value 4040404040404040 by performing an AND operation (indicated by "&") on the input word and that value. This produces as output the data word ("data") in which the only bits that are set are those that correspond to set bits in the seventh bit-position of each byte of the input word. Each of these bits is expanded to fill its byte with the cmpne instruction at line 6. Then all the bits at bit positions in the data word which in the output word will not contain bits from the seventh bit-position of the input word are masked with the AND instruction at line 8. At line 10 each byte of the data word is ORed together using addacr and the resulting output word ("output") is then bit-shifted at line 12 to move the bits to the correct positions (see FIGS. 1 and 2).

For byte 6 of the output word a similar procedure is used (lines 14 to 20). The mask used to select the bits required for the output byte is now hex 1010101010101010, to select the bits in the fifth bit-positions in the bytes of the input word. Since the output word already contains data the data word (rather then the output word) is shifted to move the new bits to their correct position and the existing output word is ORed with the data word at line 20 to introduce the bits from the data word into the output word. (The symbol "|" indicates the OR operation).

Analogous procedures are used for bytes 5 to 1 of the output word. For brevity, code for these procedures is not shown but the required masks (corresponding to that at line 15) and bit shifts (corresponding to that at line 19) are as follows:

| Byte | Mask (hex) | Bit shift |
|---|---|---|
| 5 | 0404040404040404 | 40 |
| 4 | 0101010101010101 | 32 |
| 3 | 8080808080808080 | 24 |
| 2 | 2020202020202020 | 16 |
| 1 | 0808080808080808 | 8 |

The permutation is completed at line 30 once the zeroth byte has been included in the output word.

To illustrate the procedure more simply an example using 9-bit words consisting of 3 3-bit bytes, reordered according to the DES-style bit order 3,6,9,2,5,8,1,4,7 (where in the input bit 1 is the MSB and bit 9 is the LSB) will now be described, with the values for the words shown in binary. The input word is, say:

| byte number | 1   | 2   | 3   |
|-------------|-----|-----|-----|
| bit number  | 123 | 456 | 789 |
| bit contents| 101 | 111 | 001 |

To set the second byte of the output word the input word in ANDed with the value:

100 100 100 to produce the value:

100 100 000

The set bits of each byte of this value are expanded using the cmpne instruction to produce the intermediate data word:

111 111 000.

The unneeded bits are removed by ANDing with the value:

100 010 001 to produce the second intermediate data value:

100 010 000.

The bytes of this word are ORed together to give:

000 000 110, this is shifted right 6 places to give a final data word of 110 000 000 and at this first stage the output word is set to the value of the final data word. By a similar route the final data word for the first byte is:

000 010 000 and this is ORed with the existing output word to give a new value for the output word of:

110 010 000

The final data word for the zeroth byte is:

000 000 111 and this is ORed with the existing output word to give a final value for the output word of:

110 010 111.

In a similar way, the following C code implements the IIP. Again the input and output words are (as is conventional for DES) each 64-bit words of 8 8-bit bytes. The implementation is for the computer described above using packed arithmetic on 64-bit registers each of 8-8 bit objects.

```
1    /* Shift input byte 7 to least significant byte */
2        data = input >> 56;
3    /* Expand least significant 8 bits to byte masks */
4        output = mask1p (data);
5    /* Keep one bit per byte in its required position */
6        output &= 0x4040404040404040LL;
7
8    /* Byte 6 */
9        data = input >> 48;
10       data = mask1p (data);
11       data &= 0x1010101010101010LL;
12       output |= data;
13
14   /* ETC. */
15
16   /* Byte 0 */
17       data = mask1p (input)
18       data &= 0x0202020202020202LL;
19       output |= data;
```

Bytes 5 to 1 of the output word are generated in a similar way, using the following masks and bit shifts:

| Byte | Mask (hex)       | Bit shift |
|------|------------------|-----------|
| 5    | 0404040404040404 | 40        |
| 4    | 0101010101010101 | 32        |
| 3    | 8080808080808080 | 24        |
| 2    | 2020202020202020 | 16        |
| 1    | 0808080808080808 | 8         |

In this IIP algorithm one byte of the input word is selected at a time (e.g. at line 9) by being bit-shifted to the least-significant-byte position. The bits of that byte are then expanded using the mask1p instruction (e.g. at line 10) so that all the bits of each byte of the resulting value have the same value as the bit at the corresponding bit-position in the least significant word. The unneeded bits of this word are masked out (e.g. at line 11) to leave one bit for each byte of the output and the result is combined with the output by ORing.

Modifications can be made to the algorithms to cope with more complex permutations, in particular to re-order bytes of the input word or the output word. Taking the IIP algorithm as an example, the order of byte 6 could be changed by using the following code between lines 10 and 11:

data &=0x 0420800102400810LL;
data=addacr1p (data)
data=mask1p (data)

It will be seen that this uses a similar technique to the main algorithms shown above, the key being that the mask value in the first of the instructions contains only one set bit in each byte. Other instructions such as the zip and flip instructions described above could also be used for re-ordering.

The algorithms shown above have been found to offer a significant increase in speed of execution over the look-up table technique. In execution on predictive processors the linear, unbranched format of the algorithm helps even further.

The algorithms described above are specifically useful in DES encoding and decoding. As indicated above, similar permutational methods may be used in other situations, for instance interleaving and de-interleaving.

The present invention may include any feature or combination of features disclosed herein either implicitly or explicitly together or in isolation, or any generalisation thereof irrespective of whether it relates to the presently claimed invention. In view of the foregoing description it will be evident to a person skilled in the art that various modifications may be made within the scope of the invention.

What is claimed is:

1. A method for changing the bit-order of a data value in a data processing system having a register capable of storing data strings which each comprise a plurality of sub-strings that are not individually addressable, the method comprising assigning an output data string by the steps of:

loading the data value into a first data string;

generating, for each sub-string of the output data string, a corresponding intermediate data string, each sub-string of which corresponds to a selected bit in the first data string and has all its bits equal to the value of the selected bit;

generating, for each intermediate data string, a corresponding second intermediate data string by masking all but one unmasked bit in each sub-string of the respective intermediate data string; and generating the output data string, in each sub-string of which each bit has the same value as the unmasked bit in a selected sub-string of the second intermediate data string that corresponds to that sub-string of the output data string.

2. A method as claimed in claim 1, wherein each of the intermediate data strings is generated by the steps of:

masking, in the first data string, all but the selected bits corresponding to the sub-strings of that intermediate data string; and allocating to all the bits of each sub-string in the intermediate data string the value of the unmasked selected bit corresponding to that sub-string of the intermediate data string.

3. A method as claimed in claim 1, wherein the step of generating the output data string comprises the step of:

for each sub-string of the output data string generating an intermediate sub-string corresponding to the respective second intermediate data string by performing an OR operation on the sub-strings of that second intermediate data string.

4. A method as claimed in claim 3, wherein the step of generating the output data string comprises bit shifting at least one intermediate sub-string to a desired position in the output data string.

5. A method as claimed in claim 1, wherein each bit represents a binary digit.

6. A method as claimed in claim 1, wherein the number of bits in each sub-string equals the number of sub-strings in each data string.

7. A method as claimed in claim 1, wherein for each intermediate data string no more than one of the selected bits is located in any sub-string of the first data string.

8. A method as claimed in claim 7, wherein for each intermediate data string all the selected bits are located at a single bit-position in each sub-string of the first data string.

9. A permutation method as claimed in claim 1.

10. An encryption or decryption method according to claim 1.

11. A data processing system comprising:

processing means;

a register capable of storing data strings which each comprise a plurality of sub-strings that are not individually addressable; and a program memory for storing a set of instructions for the processor to change the bit-order of a data value by assigning an output data string according to the following steps:

a. loading the data value into a first data string;

b. generating, for each sub-string of the output data string, a corresponding intermediate data string, each sub-string of which corresponds to a selected bit in the first data string and has all its bits equal to the value of the selected bit;

c. generating, for each intermediate data string, a corresponding second intermediate data string by masking all but one unmasked bit in each sub-string of the respective intermediate data string; and d. generating the output data string, in each sub-string of which each bit has the same value as the unmasked bit in a selected sub-string of the second intermediate data string that corresponds to that sub-string of the output data string.

12. A method for changing the bit-order of a data value in a data processing system having a register capable of storing data strings which each comprise a plurality of sub-strings that are not individually addressable, the method comprising assigning an output data string by the steps of:

loading the data value into a first data string;

generating, for each bit-position in the sub-strings of the output data string, a corresponding intermediate data string associated with a selected sub-string of the output data string, each sub-string of that intermediate data string corresponding to a bit-position in the sub-strings of the first data string and having all its bits equal to the value of the bit at that bit-position in the respective sub-string of the first data string;

generating a second intermediate data string corresponding to each intermediate data string by masking all but one unmasked bit in each sub-string of the respective intermediate data string; and generating the output data string, in which each of the bits at each bit-position in the sub-strings of which has the same value as the unmasked bit in a selected sub-string of the second intermediate data string corresponding to that bit-position.

13. A method as claimed in claim 12, wherein each of the intermediate data strings is generated by the step of:

expanding the sub-string associated with that intermediate data string so that each of the bits of that sub-string determines the value of all the bits in the corresponding sub-string of the intermediate data string.

14. A method as claimed in claim 13, wherein the step of generating the intermediate data strings comprises bit shifting at least one sub-string of the input data string.

15. A method as claimed in claim 12, wherein the step of generating the output data string comprises the step of:

performing an OR operation on the second intermediate data strings.

16. A method as claimed in claim 12, wherein each bit represents a binary digit.

17. A method as claimed in claim 12, wherein the number of bits in each sub-string equals the number of sub-strings in each data string.

18. A permutation method as claimed in claim 12.

19. An encryption or decryption method according to claim 12.

20. A data processing system comprising:

processing means;

a register capable of storing data strings which each comprise a plurality of sub-strings that are not individually addressable; and a program memory for storing a set of instructions for the processor to change the bit-order of a data value by assigning an output data string according to the following steps:

a. loading the data value into a first data string;

b. generating, for each bit-position in the sub-strings of the output data string, a corresponding intermediate data string associated with a selected sub-string of the output data string, each sub-string of that intermediate data string corresponding to a bit-position in the sub-strings of the first data string and having all its bits equal to the value of the bit at that bit-position in the respective sub-string of the first data string;

c. generating a second intermediate data string corresponding to each intermediate data string by masking all but one unmasked bit in each sub-string of the respective intermediate data string; and d. generating the output data string, in which each of the bits at each bit-position in the sub-strings of which has the same value as the unmasked bit in a selected sub-string of the second intermediate data string corresponding to that bit-position.

* * * * *